(12) United States Patent
Erdmann

(10) Patent No.: US 9,596,132 B1
(45) Date of Patent: *Mar. 14, 2017

(54) VIRTUAL SANDBOXING FOR SUPPLEMENTAL CONTENT

(71) Applicant: Amazon Technologies, Inc., Seattle, WA (US)

(72) Inventor: David Erdmann, Edmonds, WA (US)

(73) Assignee: Amazon Technologies, Inc., Reno, NV (US)

( * ) Notice: Subject to any disclaimer, the term of this patent is extended or adjusted under 35 U.S.C. 154(b) by 160 days.

This patent is subject to a terminal disclaimer.

(21) Appl. No.: 14/678,750

(22) Filed: Apr. 3, 2015

Related U.S. Application Data

(63) Continuation of application No. 12/569,484, filed on Sep. 29, 2009, now Pat. No. 9,032,066.

(51) Int. Cl.

| | | |
|---|---|---|
| G06F 15/173 | (2006.01) | |
| H04L 12/24 | (2006.01) | |
| H04L 12/26 | (2006.01) | |
| H04L 29/08 | (2006.01) | |
| H04L 12/911 | (2013.01) | |
| G06F 21/53 | (2013.01) | |
| H04L 29/06 | (2006.01) | |
| G06Q 30/02 | (2012.01) | |

(52) U.S. Cl.
CPC .......... *H04L 41/0681* (2013.01); *G06F 21/53* (2013.01); *H04L 43/08* (2013.01); *H04L 47/781* (2013.01); *H04L 67/303* (2013.01); *G06Q 30/0277* (2013.01); *H04L 63/102* (2013.01); *H04L 63/14* (2013.01)

(58) Field of Classification Search
CPC   G06Q 30/0277; G06Q 30/0253; H04L 63/14; H04L 63/102
See application file for complete search history.

(56) References Cited

U.S. PATENT DOCUMENTS

| | | | |
|---|---|---|---|
| 5,974,549 | A  | 10/1999 | Golan |
| 7,757,088 | B2 | 7/2010  | Abdulhayoglu |
| 8,296,848 | B1 | 10/2012 | Griffin et al. |
| 2008/0194332 | A1 | 8/2008 | Kadikario et al. |
| 2009/0132359 | A1 | 5/2009 | Borshack |

(Continued)

OTHER PUBLICATIONS

U.S. Appl. No. 12/569,484, filed Sep. 29, 2009, Titled: Virtual Sandboxing for Supplemental Content.

(Continued)

*Primary Examiner* — John MacIlwinen
(74) *Attorney, Agent, or Firm* — Kilpatrick Townsend & Stockton LLP

(57) ABSTRACT

A virtual sandbox environment enables a publisher to publish rules for supplemental content, such as third party advertising, displayed on a page or other grouping of content from the publisher. One or more rule sets can be applied or enforced in a number of ways, such as through active script on a page, as part of a browser or other such application or interface, or via a third party such as an anti-virus application or service. A rule set can specify behavior that is allowed or prohibited, in various circumstances, as well as actions to be taken in response to any unapproved or prohibited behavior. Rule sets may be maintained on, and enforced by, or cached on a client device such that any number of pages or other groupings of content can utilize the same rule set without reloading the set.

20 Claims, 5 Drawing Sheets

(56) References Cited

U.S. PATENT DOCUMENTS

2009/0327869 A1    12/2009  Fan et al.

OTHER PUBLICATIONS

U.S. Appl. No. 12/569,484, Final Office Action, mailed May 29, 2013, 17 pages.
U.S. Appl. No. 12/569,484, Non-Final Office Action, mailed Dec. 19, 2012, 14 pages.
U.S. Appl. No. 12/569,484, Notice of Allowance, mailed Feb. 20, 2015, 7 pages.

VIRTUAL SANDBOXING FOR SUPPLEMENTAL CONTENT

CROSS-REFERENCE TO RELATED APPLICATIONS

This application is a continuation of U.S. patent application Ser. No. 12/569,484, filed Sep. 29, 2009, entitled "VIRTUAL SANDBOXING FOR SUPPLEMENTAL CONTENT," the content of which is hereby incorporated by reference in its entirety.

BACKGROUND

As the amount of information available electronically increases, content providers are increasingly turning to external or third party providers to supply at least a portion of the content provided to users, such as to viewers of a Web page offered through a Web site of the provider. For reasons such as consistency and user experience, the content providers often want at least some level of control over this third party content, as supplemental content such as advertising can sometimes generate new windows or expand over the primary content on the page, which can be undesirable for both the content provider and the users.

More importantly in many cases, however, is the fact that third party content can be used to distribute viruses and malware, as well as to perform any of a number of potentially malicious actions. For example, third party advertising is one of the most efficient mechanisms for distributing viruses and malware, but a content provider often has to rely on an outside provider of the advertising to monitor the types of ads being provided. In some cases, script in an ad can rewrite a host file such that content can be pulled in from unintended sources. Other types of supplemental content can perform similar activities as well, such as to capture user information or perform actions, such as unauthorized purchases, that appear to come from a particular user.

Conventional approaches to preventing such unintended functionality have been limited. For example, a provider or user might be able to disable certain types of content, but this typically is done globally and thus can be undesirable in many instances as the approach can be over inclusive. In other cases, any calls from third party content can be denied, but this again can limit the functionality, which in some cases can be desirable or even necessary for proper or intended operation.

BRIEF DESCRIPTION OF THE DRAWINGS

Various embodiments in accordance with the present disclosure will be described with reference to the drawings, in which.

DETAILED DESCRIPTION

Figure 1:
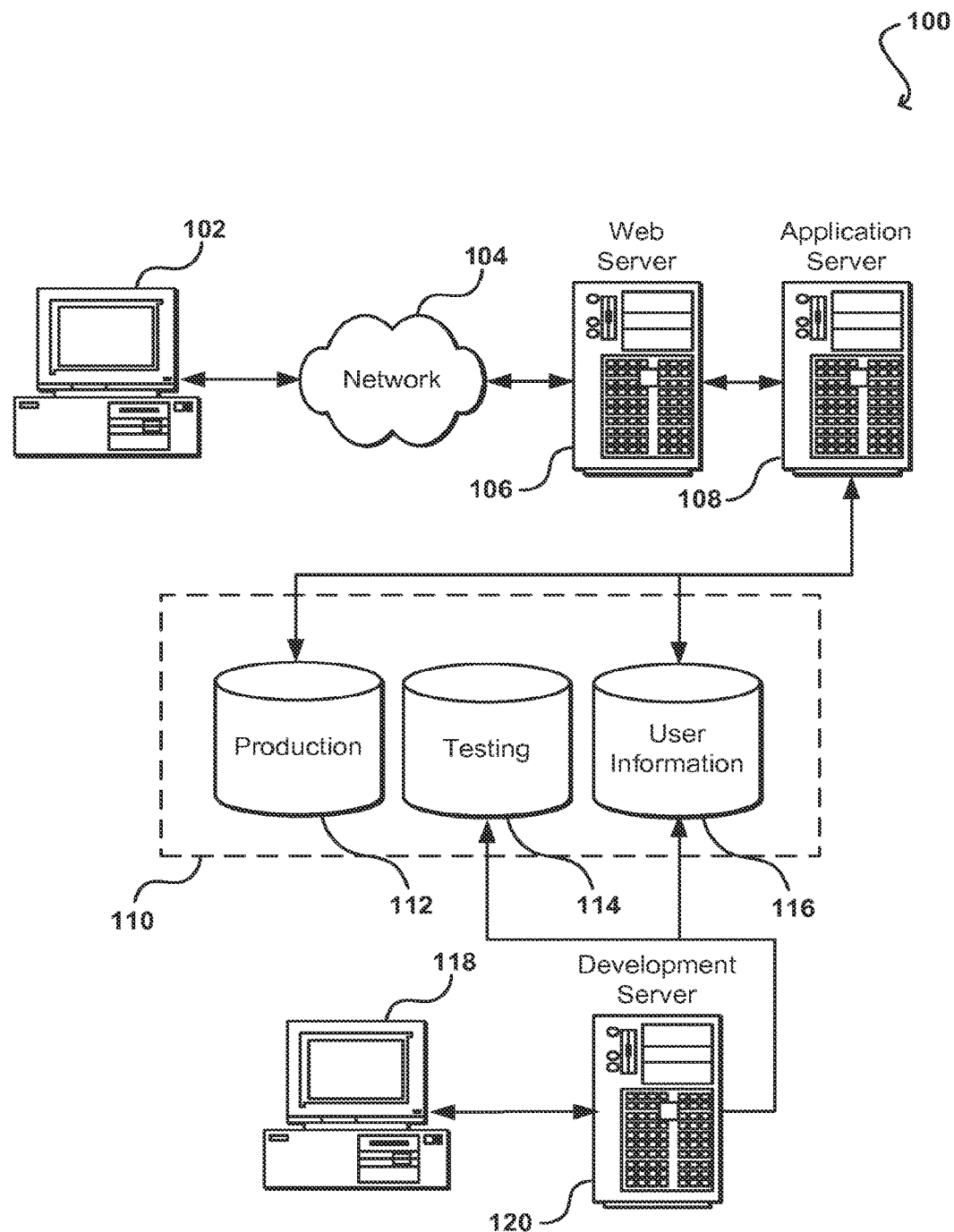
FIG. 1 illustrates an environment in which various embodiments can be implemented.

Systems and methods in accordance with various embodiments of the present disclosure may overcome one or more the aforementioned and other deficiencies experienced in conventional approaches to managing supplemental content in an electronic environment. Various embodiments provide for the definition of rule sets, policies, or other such elements that can be used to define allowable and/or prohibited behavior of supplemental content included on a page or other such instance of content. The rules can be accessed by code executing on the page, an application (such as a Web browser) providing the page, or other applications or services operable to monitor actions performed by the supplemental content on the page.

Various embodiments allow an entity such as an electronic publisher or primary content provider to provide a virtual "sandbox," which allows the entity to specify allowable behavior for a page, site, or other grouping of content accessed in the sandbox, as well as behavior that is not to be allowed in the sandbox. It should be understood that the term "publisher" is used herein to refer to a provider of "primary" content, or the content requested by a user, for example, this term should not be construed as limiting the scope of the various embodiments to a "publication" or other specific action, as primary content can be provided from a number of different sources in a number of different ways within the scope of the various embodiments. Information for the defined rules can be published or saved to an accessible location, such as a file maintained on a client, server, etc. A publisher also can be enabled to define actions to be taken in the event that supplemental content attempts to perform an activity outside of the allowable behavior. The actions can include notifying any of various parties, for example, such as the provider of the application or browser displaying and/or executing the content, the publisher of the original and/or supplemental content, a user viewing or otherwise accessing the content, or a third party such as a virus scanning company. The actions also can include preventing the behavior from initiating or completing, flagging the behavior, limiting the performance or execution of the behavior, etc.

In some embodiments, the publisher can provide rules as part of a library, such as a JavaScript library or other active scripting library, that can be included on each page call, enabling the rules to work with conventional applications such as Web browsers. In other embodiments, applications such as browsers can load a specified set of rules from a trusted source. In some cases, the same set of rules could apply to each page on a site, such that the browser can cache the rule set and apply the rule set for each page of the site without reloading the rules. In other embodiments, third party applications such as virus scanners can load or access the rule set for use in monitoring activities and determining potentially malicious or at least unintended behavior outside allowed actions.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for a publisher of a site such as an electronic marketplace, wherein multiple sources might be used to provide content for different portions of a generated page. As discussed above, however, sometimes a publisher might wish to generate pages that pull supplemental content such as advertisements or personalized content from multiple sources, either from the same provider or from other providers. The electronic environment in such a case might include additional components and/or other arrangements, such as those illustrated in the configuration 200 of FIG. 2. In this example, a user of a client device 202 might submit a request for content across a network 204 that is directed to at least one provider 206, 208. In order to respond to the request, such as by sending a reply page to be displayed on the client device 202, content might be provided by a Web server 210 of a first provider, which might utilize one or more application servers 212, 214 to pull content from one or more data repositories 216, 218 and generate page content to be rendered by the client device 202. In some cases, each application server 212, 214 for the provider might correspond to a different domain. For example, a first application server 212 might correspond to a non-secure domain, which provides content such as landing pages or static content pages. A second application server 214 might correspond to a secure domain, which might provide functionality such as virtual shopping carts, online payments, and other such secure operations.

In order to provide all necessary content for the page, at least a portion of the content also might be provided by at least one other provider 208, such as an advertising entity providing advertising content. In this case, a Web server 220 might serve content from an application server 222 able to pull content from at least one repository 224, and the server 222 might send the content directly to the client device 202 across the network 204 or in some embodiments might send the content to the first provider 206 such that the first provider sends all page content together. In this example, the second provider 208 also might correspond to a separate domain. Although two content providers are shown, and the example is described with respect to three domains for a page, it should be understood that any of a number of providers and/or domains could be used to provide content for a page as known or used in the art.

Figure 2:
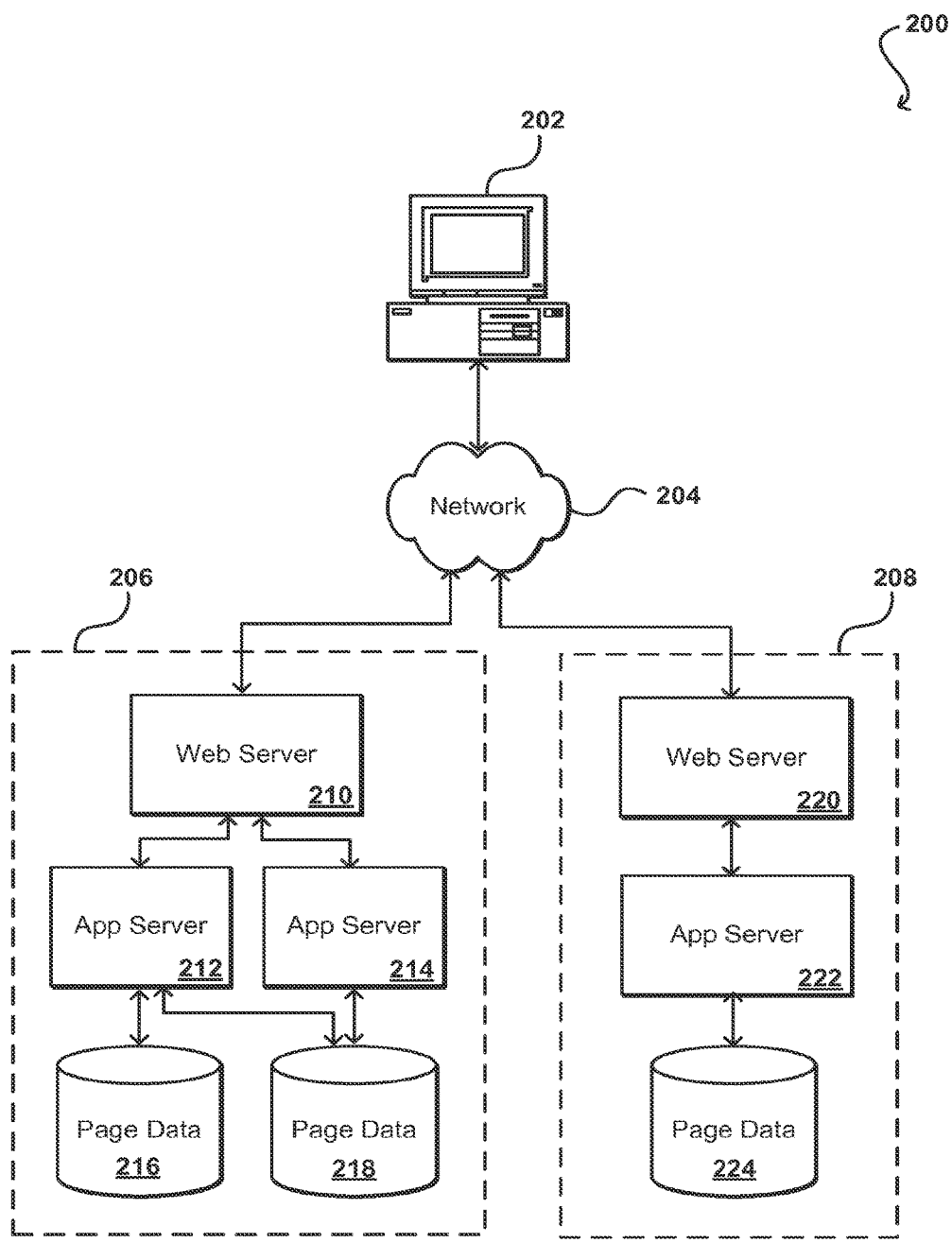
FIG. 2 illustrates a system for providing a user with content from multiple domains that can be used in accordance with one embodiment.
Figure 3:
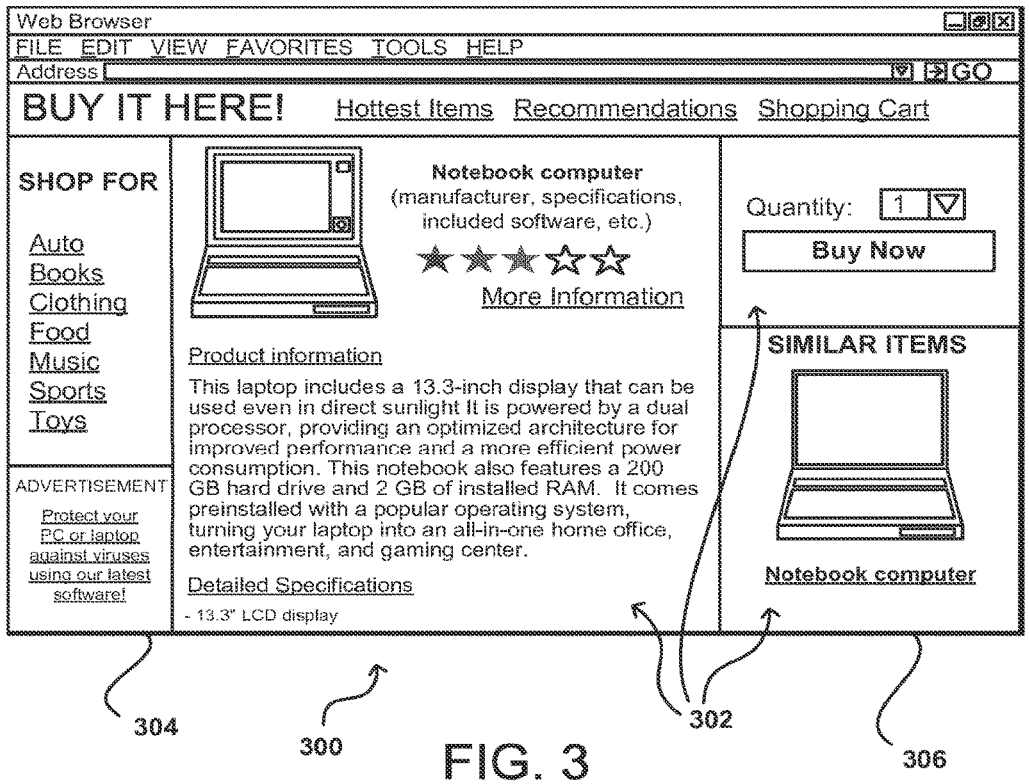
FIG. 3 illustrate an example of a display that can be utilized in accordance with various embodiments.

FIG. 3 illustrates an example page 300 that could be generated by a system such as that illustrated in FIG. 2. In this example, the page includes a number of different areas 302 (such as frames in a frameset) that each display content derived from a specific location (e.g., as identified by a specified uniform resource locator (URL)). As shown, different areas of content can provide different types of functionality, such as providing a display page of information about an item, the ability to purchase the item, providing related advertisements, providing the ability to navigate to other content, etc. As discussed, this functionality can be provided from sources corresponding to different domains or providers. In this example, the overall page or site accessed by the user is provided from a first domain, which can correspond to a publisher or primary provider of the site. Areas that may correspond to a title bar, a set of navigational links, a display page including the requested content to be viewed by the user, and a link to a similar item, as well as other such content can all be provided from the primary content provider domain. Even though the overall marketplace might be provided from the same domain, other "supplemental" content displayed in other areas of the page can come from other domains or providers, such as an advertisement 304 from a third party advertiser and personalized content 306 from a third party content provider. It is common to provide advertisements and/or other supplemental or personalized content from other domains, and display this content in a designated area (e.g., frame) on the page.

Figure 4:
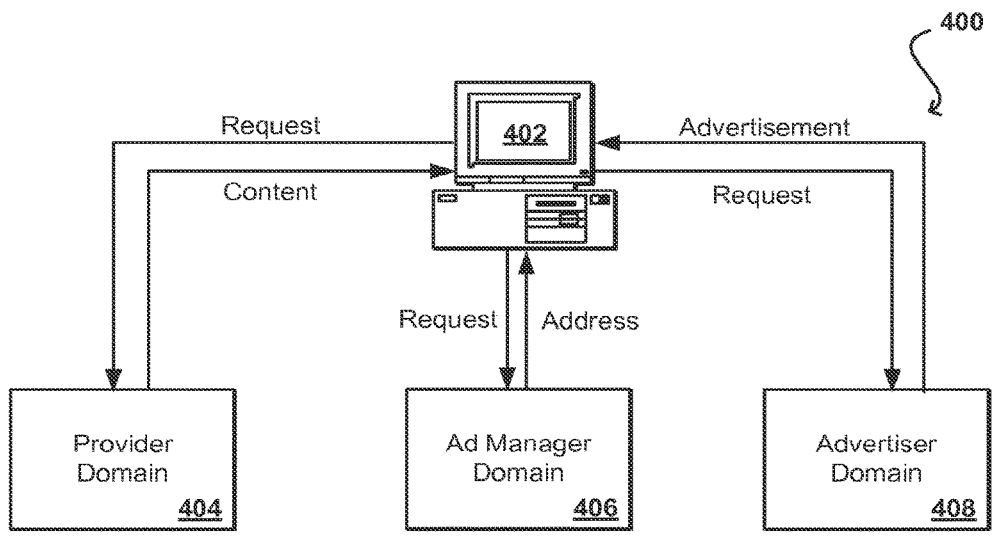
FIG. 4 illustrates an example flow of requests for serving supplemental content that can be used in accordance with various embodiments.

FIG. 4 illustrates an example environment 400 showing a flow of calls, requests, or other transfer of information that can be used to provide such supplemental content in accordance with various embodiments. In this example, a user can submit a request for content using a client device 402. The request can be submitted across a network as discussed elsewhere herein. The request is submitted to a domain 404 or address of the publisher, or primary content provider. In response to receiving the request, a page or other such grouping of primary content can be returned to the client device 402 to be displayed to the user. The primary content can include an address or location to be used in providing an advertisement or other supplemental or external content for the page. The client device can send another request using the address (such as may be provided using a first URL) to contact the advertising manager domain 406, which can manage the advertising to be displayed on the page. As part of the process, the ad manager can determine at least one advertisement from a third party advertiser to display with the primary content. The ad manager thus can respond back to the client device with a second address or URL. The client device then can submit a request, using the second URL, to a third party advertiser domain 408. The third party advertiser can determine an advertisement or other such supplemental content, and can provide that content in a response to the client device to be displayed with the page from the content provider domain 404.

As discussed, supplemental content can engage in specific behavior with respect to the rest of the page, such as modifying code or intercepting information. In some cases, providers will place supplemental content in dedicated frames, as many conventional browsers or other such interface applications do not allow for cross-domain communication. Thus, while a content provider might want to display an ad or other content from another domain on that page, the provider may not want that domain to have any control over, or ability to modify, the content from the other domains. A potential downside, however, is that the provider can have little to no control over the content in the frame(s) serving from another domain. Further, information being passed between the frames, such as from a provider page to an advertising entity, can potentially be exposed to a third party. If the request is sent across a publicly accessible network, such as the Internet, various parties can attempt to intercept or monitor the requests. In some cases, a third party might include code in an advertisement that is able to capture information from the URL and provide that information to unintended recipients. In some cases, a third party might be able to rewrite URLs or other such information, such that in a situation such as that illustrated with respect to FIG. 4, the address of the ad manager can be re-written whereby the primary content directs the client device 402 to send a request for supplemental content to an unapproved domain, which can cause any type of supplemental content to be displayed on a page, such as inappropriate advertising from any third party advertiser, etc.

As discussed previously, content providers such as Web site publishers would generally like to have as much control as possible over the actions performed by supplemental content (e.g., advertising or third party content) embedded in, or otherwise viewable via, a page of the Web site provided by the publisher. The publishers also should easily be able to recognize behavior that is outside of normal operation for the site. As such, the publishers can be in the best position to provide rules or policies as to what behavior should, or should not be, allowed for supplemental content.

Systems and methods in accordance with various embodiments thus can enable content providers to define and publish lists of allowable and/or forbidden behavior for pages, sites, or other groupings of content in an electronic environment. The various embodiments also can enable a provider to define specific actions to take in response to at least some of the forbidden or other non-allowable behavior. As discussed, such actions can not only include notifying parties such as the publisher, user, browser company, advertiser, or appropriate third party, for example, but also can include preventing or stopping the behavior, flagging or storing information to a log, etc.

A publisher in various embodiments is able to create a virtual sandbox environment in which any or all content corresponding to that content provider is to be executed, displayed, etc. The publisher then can have a level of control over any behavior attempted within that sandbox. As used in the industry from a security context, a "sandbox" generally refers to a mechanism for running applications such as potentially untrusted third party applications, providing only a specific set of tightly-controlled resources that are available for those applications. The ability for those untrusted applications to access outside resources is typically prevented or heavily restricted. While a standard page being displayed in a conventional browser does not have the ability to restrict network and/or hardware access in many embodiments, a defined set of rules can be implemented that can prevent certain calls or behavior from being executed by supplemental content within the virtual sandbox.

Such an approach provides both control and flexibility, as a publisher can be as restrictive as is desired. Each publisher can define or select a specific set of rules that define behavior with respect to that publisher. For example, some advertisements will expand beyond their initial space allocation in response to an action by a user, such as the user clicking on or "mousing over" the advertisement. If a publisher defines a rule that supplemental content in the sandbox is not able to expand beyond its initial allocation, then the publisher can effectively prevent the ad from expanding upon the user action. In this way, the same ad can appear and/or function differently on sites or pages from two different publishers. Similarly, certain publishers might allow third party content to make calls to determine information useful for providing personalized third party content, while other publishers might provide rules that prevent such behavior. Publishers can manage such actions by providing lists of forbidden activities, allowed activities, or combinations thereof. For example, a first provider rule set might specify to allow only the listed set of activities. Another provider might specify to allow any activity or behavior except for those listed. A provider also might specify a rule set that indicates specific behavior to always be allowed, and specific behavior to never be allowed. Any other behavior might result in information being logged or flagged, for example, such that the publisher can investigate any unknown actions and make a determination whether to allow (e.g., while list) or disallow (e.g., blacklist) that behavior in the future.

A publisher also can be as specific or general as desired. For example, a publisher might allow specific calls for a specific third party provider (e.g., content from a specific domain) or disallow certain behavior for specific types of content. The publisher can define rules for specific calls, or for types of calls, such as any call that attempts to modify code outside the virtual sandbox (e.g., other sections of the document object model (DOM) tree defining the page). A publisher can also define rules that apply to specific JavaScript functions or any other such type of active scripting content, as well as rules that define the types of content that can be brought in by the supplemental content, locations to which links can or cannot be provided, etc.

Figure 5:
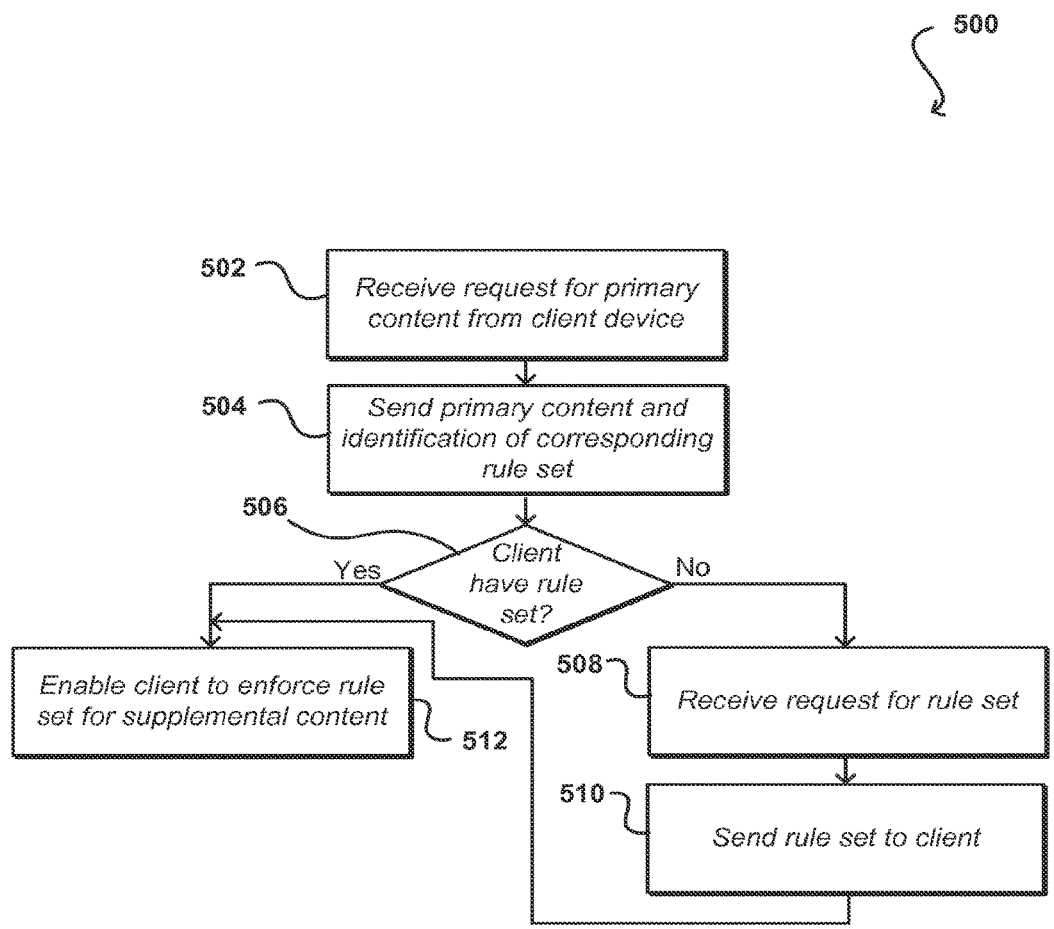
FIG. 5 illustrates an example process for providing a rule set to be used with specified primary content in accordance with one embodiment.

FIG. 5 illustrates steps of a general process 500 for associating a rule set with primary content that can be used in accordance with various embodiments. While the example is described with respect to requests from a client device, it should be understood that a rule set can be specified and/or applied for any specific content for any appropriate purpose within the scope of the various embodiments. In this example process, a request for primary content is received from a client device 502. In an Internet-based context, this can include an HTTP request sent to a specified URL, which can be generated in response to a user action such as a submission of a search request or navigation to a particular page or site. The request can be sent to an appropriate location, such as an address corresponding to a Web server of the publisher or primary content provider. In response, the primary content can be sent to the client device, along with information identifying a rule set to be utilized for the content 504. The rule set can be identified using any appropriate approach discussed or suggested herein, such as to include a URL in the HTML or other such code returned to the client device. In other cases, the rule set can be sent as a separate message, etc. The rule set can be cached at the client device, such that the cached version can be utilized for any page identifying that rule set.

After the client device receives the identifying information for the rule set to be used when displaying the primary content, a determination can be made as to whether the client device has a copy of the rule set stored locally 506, or otherwise accessible to the client device. If not, the client device can request the rule set 508, such as by utilizing the URL included with the primary content. The rule set can be transmitted to the client device 510, and can be stored, cached, or otherwise processed as discussed herein. Once the client device has the rule set specified for the page of primary content, the client (or another entity, application, or service) can enforce that rule set against any supplemental content that is loaded onto the page, or otherwise accessed via the page 512. As discussed, the primary content might cause supplemental content such as advertising to be displayed on a portion of the page, and the client device can enforce the rules of the rule set on actions of the advertising, particularly when the advertising comes from a different domain, provider, or other such external source.

Figure 6:
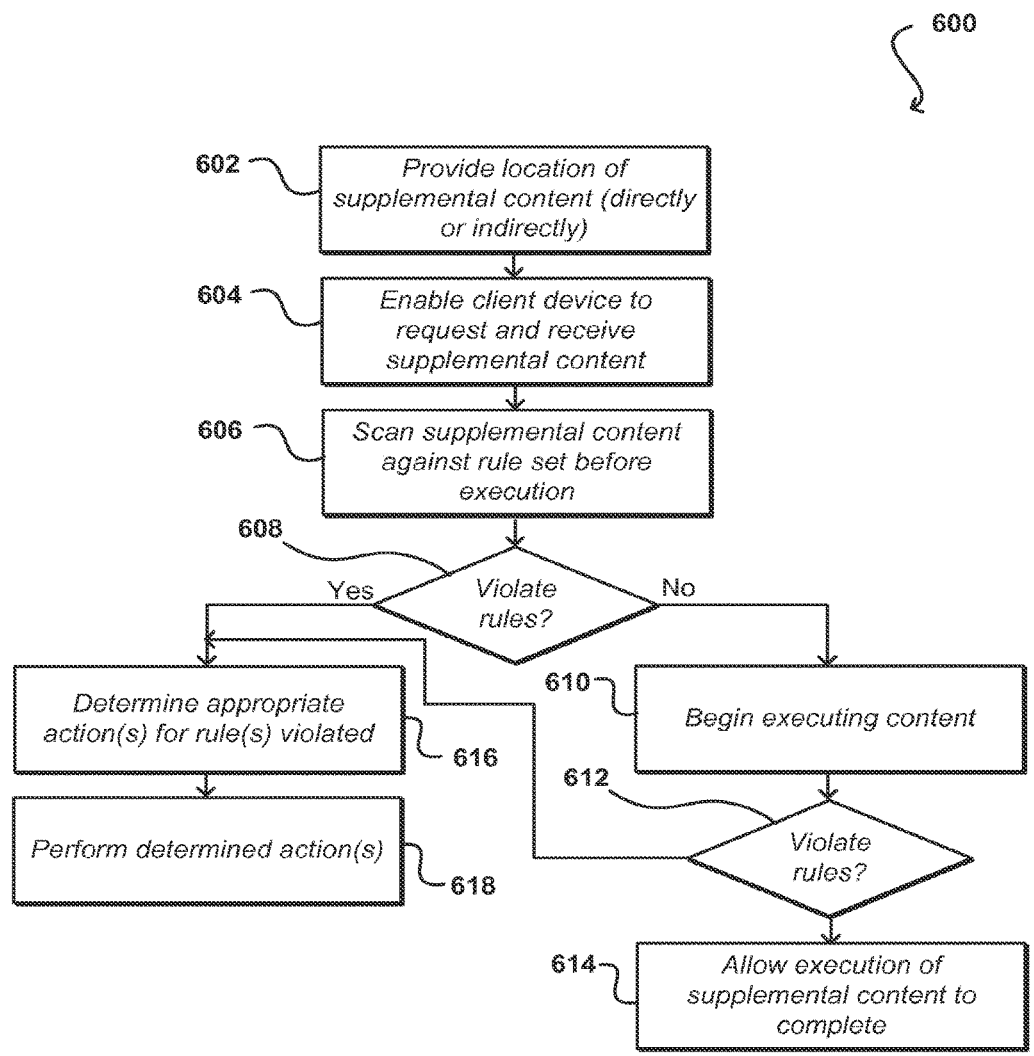
FIG. 6 illustrates an example process for enforcing a rule set for supplemental content in accordance with one embodiment.

In one embodiment, the rules can be applied as described with respect to the example process 600 illustrated in FIG. 6. As discussed, the publisher can provide to a client device (or similar device) a location and/or identification of supplemental content to be displayed on a page or other grouping of primary content 602. As discussed, the identification of the supplemental content can be supplied directly by the publisher, or indirectly through use of an ad manager or other such entity or component. By identifying the content and properly coding the page or other grouping of content to be displayed, the client device can be enabled to request and display the supplemental content as specified for the page, etc. 604. In certain embodiments, the supplemental content can be scanned before execution to determine whether the supplemental content violates any rules in the rule set 606. As discussed, the scanning can be performed by the client device, an external service, or any other appropriate source. Further, the scanning can be performed at the time of download, before storing the content into memory, at the time for execution of the content, or at any other appropriate time. In some cases, multiple pre-execution scans can be performed at different times. A determination is made as to whether the rules are violated 608. If the rules are not violated, activities of the supplemental content can begin to be executed at the appropriate time 610. Another scan or monitoring can occur to determine whether the execution violates any of the rules of the specified rule set 612. If not, the execution of the supplemental content can be allowed to complete 614.

If at any time the behavior of the supplemental content is determined to violate one or more of the rules of the specified rule set, the client device (or other source) can determine one or more appropriate actions to be taken for the violation(s) 616. As discussed elsewhere herein, this can include actions such as notifying one or more parties, logging or flagging information for the violations, or stopping execution of the supplemental content. Once the action(s) are determined, the action(s) can be performed as necessary 618. As should be apparent, additional, fewer, or alternative steps can be used, in varying orders and/or concurrently, within the scope of the various embodiments.

Functionality such as that described with respect to FIGS. 5 and 6 can be implemented in a number of different ways in accordance with the various embodiments. A first approach may be preferred by some publishers, as the functionality can easily be incorporated into conventional applications such as Web browsers. Many pages or other instances of content utilize one or more active client-side scripting languages, such as JavaScript. In such an embodiment, the publisher can define a set of rules that can be stored as part of a JavaScript library that could be included onto each appropriate page call. For example, a request can be sent from a client browser for content from a publisher. The publisher could, in turn, provide the requested content, along with a pointer (or other identifying information) to a file or other set of rules that define the actions that can be executed with respect to the page, as well as how those actions can be executed. The JavaScript (or other active scripting language) itself then can monitor activity with respect to the page and enforce the rules using a JavaScript library or other information that can be loaded and stored onto the respective client device. The JavaScript on the page can cause the browser or other application to access the third party content, which then can be executed inside the virtual sandbox in the browser.

The control can be somewhat difficult in such an embodiment, as there typically are limits as to what can be viewed in active content such as JavaScript or flash. If a page includes such content loaded in an iFrame, for example, the JavaScript for the publisher cannot peer into that iFrame. Thus, the system might have to attempt to determine whether the underlying DOM is being affected in a way that is generally not allowed, such as by specific functions being called inside the DOM tree but outside the portion allocated to the iFrame. An approach in accordance with one embodiment specifies that specific functions are never called by trusted content. If the system notices that one of those functions is being called, the action can be blocked as there is likely an untrusted action being performed.

In some embodiments, the active scripting language can attempt to do a pre-scan of the third party script to attempt to determine the presence of untrusted code. Once the script is loaded, various functions can be redefined, sources adjusted, calls changed or removed, or various other manipulations performed. Further, the script could be passed through a rule scanner before being executed. Such an approach can provide several points at which potentially harmful or untrusted code or functionality can be determined and/or addressed.

In accordance with another embodiment, various rules can be enforced by the browser or other such application executing the content. For example, a page or site can specify a file or other such rule set to be loaded and/or applied by the browser for each page (or specific pages) of the site for a particular publisher. By utilizing a single file for all the pages on a site, the browser can download the file once (e.g., per session) and use a cached version of the file for all pages viewed during the session, thus decreasing the amount of network bandwidth and client storage needed, etc. Further, by building the rule set enforcement into the application itself instead of the script on a page, the enforcement in many cases can be faster and more secure that script or service-based enforcement. Using the script for enforcement also provides potential opportunities for tampering with the code, or bypassing the case, and the code must be managed by, and loaded for, each publisher. In some cases, utilizing script-based enforcement would require the user to download the virtual environment for each page. When using browser-based enforcement, however, a single file can be downloaded that can be applied across an entire site, domain, etc. There would be no need to load a rules engine, as the functionality would be part of the browser. Further, third parties such as anti-virus companies could leverage this functionality as discussed later herein.

In one example, a request can be sent from a client browser for content from a publisher. The publisher could, in turn, provide the primary content for the request, along with a pointer (or other identifying information) to set of rules that define the activities that can be executed with respect to the page for content from another provider or source, as well as how those activities can be executed. In some cases, the identify or location (e.g., a URL) of the rule set can be passed in a header of the code for a page. The rule set in some embodiments is an XML file that can be cached similar to an image for a Web page, and that can have an "expires" or similar value in a header or other location such that the file is not pulled in every time a page or item utilizing the file is accessed.

In some cases, a page to be displayed from the publisher will include a call or request for third party or other supplemental content. Since the content originates from a different domain or source, for example, the browser can apply the rule set indicated for the page. The browser can attempt to evaluate the supplemental content (e.g., JavaScript, widgets, Flash, HTML, CSS, etc.) against the rule set as the content is executed. If the browser detects behavior such as the content calling an allowed JavaScript function, the call can be allowed to proceed. If the called function is not allowed according to the rule set, the call can be flagged or otherwise prevented from being allowed and/or executed. Any code executing from a domain other than the domain of the page (or publisher) can be evaluated against the rule set automatically using the browser application. Thus, even though a publisher cannot easily determine what is occurring inside a frame or other element sourced to a different domain, the publisher can monitor the external activities attempted by that domain and can ensure that the activities comply with the established rules for the sandbox. As discussed, the rules can be as general or specific as desired by the publisher, such as may include different rules for different supplemental content providers, etc.

In many cases, JavaScript and other active content is passed through a compiler inside the browser. Extra checks can be added to the complier via the rule set such that the browser can know to take action if specific calls are detected, either during a pre-scan operation or at the time of execution. Further, the browser can perform designated actions when one of those calls is detected during execution, such as to stop execution or shut down completely. For example, if third party content is attempting to access information outside the sandbox, the attempt can be blocked, while if the third party content is attempting to modify the DOM or other code on the machine the browser can shut down in order to prevent any irreparable damage, etc.

The browser implementation can be accomplished in at least one embodiment by building the functionality directly into the browser code. While this could potentially provide the most security, it would require users to upgrade to specific browsers or at least browser versions, which can be unreliable at best. In other cases, the functionality can be provided as a plug-in that can be downloaded and applied to many existing browsers or other applications.

In some embodiments, rule sets can be utilized by third party applications and/or services such as anti-virus applications. For example, a publisher might provide a rule set that is to apply for all pages and/or content accessed via a page or site from that publisher. A virus scanner can load or otherwise access the rule set and monitor the behavior of third party content with respect to the allowed (or disallowed) activities specified by the rule set.

Using such an approach, a publisher would not necessarily have to provide a virtual environment to enforce the rules, but could rely upon users to utilize anti-virus protection, which could instead enforce the rules. In some cases, the publisher could provide rules to which content providers are to adhere. Antivirus scanning companies can leverage the same rule set, as any approved content should adhere to those rules. Even though not all users would generally have anti-virus protection, enough instances of the virus scanners blocking certain behavior can be sufficient to prevent third party content providers from utilizing unapproved behavior. An added benefit of such an implementation is that conventional virus scanners attempt to match content to millions of signatures that are indicative of viruses, malware, etc., which can be a slow, complicated, and/or less than optimal process. By leveraging a list of approved activities, virus scanners can more quickly and easily determine behavior that is outside the defined bounds of allowable behavior. Further, specific content providers, sites, domains, or other sources can be identified as being allowed or not allowed, such that any attempt to pull in content from one of those sources can easily be classified as approved or not approved. In some cases, a publisher can attempt to provide a complete list of approved actions and sites, etc., such that any activity outside the list can be determined to be a virus, malicious code, etc.

As discussed, one type of rule can relate to the structure of the page including the third party content. For example, where an HTML page is defined by a DOM tree, third party content might only be allowed to access a portion of the DOM tree that corresponds to the third party content. Any attempt to access or modify other portions of the DOM can be prevented.

As another type of rule, third party content might not be allowed to use functions that load content from other sites, domains, or providers. In some cases, loading content might be allowed from some sources and/or disallowed from some sources. In some cases content can be allowed to be loaded, but the third party content can be prevented from modifying any URLs or other links or navigational elements relating to the publisher domain, etc. In some cases, third party content can utilize any available JavaScript on the page, but is not allowed to modify the JavaScript. In other cases, the third party content is not allowed to access any other functionality on the page.

Further, rules can be associated with specific actions to be taken for certain circumstances. For example, if third party content attempts to access an untrusted domain, the rule can specify whether to block the attempt, generate a notification, attempt to confirm the action (e.g., generate a popup asking the user to allow), log information, shut down the browser, etc. In some cases, information can be sent to an entity such as a publisher or anti-virus company that can investigate behavior if multiple reports are received about a particular rule being violated, etc. In other embodiments, the behavior can be allowed initially but if multiple instances are recorded then the content can be blocked and/or removed.

In embodiments where a publisher does not want to have to rely upon end users to utilize specific browsers, plug-ins, etc., a publisher can provide rule set enforcement as a service that can be called by script on the page. Such an approach can attempt to ensure that third party providers are following the rules. A potential problem with such an approach, however, is that the calls will typically pass through unsecured or public channels, such that the calls can potentially be intercepted and/or modified by third parties, etc.

In some embodiments, the browser application could have an internal (or external) set of default rules that can be leveraged by various publishers, etc. The browser rule set can have specific rules, such as to not allow specific calls or allow modification of the DOM, for example, and a publisher can specify which of those rules to apply to a page, site, etc.

In another example, a third party service (e.g., an anti-virus company) can scan the pages of a publisher site to determine all the calls, functions, and other allowable behavior, and dynamically generate a list of approved actions for the site. In another embodiment, the service could determine specific functions that are never called, or other behavior that is not engaged by the site. A set of rules then can be generated that can be used to detect any suspicious activity. The site could be rescanned periodically (e.g., daily) to ensure that the rule set is substantially current. In other embodiments, the scan could be applied to any new or updated content that is added to the site, and could be executed any time content is removed from the site, etc.

In some embodiments, a publisher can specify exceptions to specific rules. For example, a rule could indicate that external content is not allowed unless the content comes from a specific domain. A user can also have the ability in some embodiments to define exceptions, or even additional rules, to apply to various sites, etc. In some cases, these user-defined rules can be made available or otherwise discoverable (e.g., as a parameter in a URL or HTTP GET call) by the publisher, or another such entity, whereby appropriate content selections can be made. For example, if the publisher allows pop-up ads but the user does not, a publisher discovering this rule might be able to select an advertisement that displays properly without having to utilize a pop-up window, etc.

As discussed, a virtual sandbox in some embodiments can be implemented in conjunction with at least one inline frame (commonly referred to as an "iFrame"). An iFrame can be used to display supplemental content, such as advertising, which can originate from a separate domain or external source. An iFrame is a structure in the hypertext markup language (HTML) that allows another HTML document or other such object to be inserted into an HTML page, similar to a standard frame. An iFrame typically is included in a page using an <iframe> tag including a source attributed to designate the URL of a page to be displayed in the iframe. An example of an iFrame tag is as follows:

<iframe src="pageURL"></iframe> where "PageURL" corresponds to the URL or location of the content. The iFrame tag can include various other attributes known in the art, such as to set dimensions of the iFrame. Further, the source attribute does not need to specify a page, but can point to a document, image, object, or other element capable of being displayed on a page. Because the iFrame is an inline element, the iFrame does not need to be used in a typical frameset, but can be positioned on the page similar to text, images, or other inline elements using an "align" or similar attribute. It should be understood, however, that various other constructs can be used to clearly distinguish between first party and third party content, etc.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of managing behavior of supplemental content in an electronic environment, comprising:
    receiving, at a resource provider computing system, a request to a content publisher, the request received from a browser application executing on a client device;
    providing, to the client device, a response including code for a page to be rendered by the browser application, the page including primary content corresponding to the request and at least a portion of the page dedicated to supplemental content;
    providing, to the client device, access to a rule set including rules defining activities for supplemental content configured to be displayed on the page, the supplemental content originating from a source other than the content publisher, and a behavior of the supplemental content loaded for the page capable of being monitored to ensure that the behavior complies with the rules of the rule set corresponding to the page; and
    instructing, by the resource provider computing system, the browser application to perform one or more actions with respect to the supplemental content in response to detecting the behavior of the supplemental content that violates at least one of the rules in the rule set, the one or more actions comprising at least one of causing execution of a prohibited activity to stop, limiting execution of the supplemental content, or causing an application executing the prohibited activity to be shut down.

2. The computer-implemented method of claim 1, wherein the rule set further specifies the one or more actions to be taken when the behavior of the supplemental content violates at least one rule of the rule set.

3. The computer-implemented method of claim 1, wherein access to the rule set is provided to the client device prior to receiving the request.

4. The computer-implemented method of claim 1, wherein the supplemental content further includes any content originating from a domain other than a domain of the publisher of the primary content.

5. The computer-implemented method of claim 1, wherein the rule set is provided as a file capable of being stored in a memory of the client device receiving the primary content.

6. A system for managing behavior of supplemental content, comprising:
    a processor;
    a memory device including instructions that, when executed by the processor, cause the processor to:
        receive, at a resource provider, a request for primary content from a client device;
        provide, to the client device, a rule set to be cached by the client device including rules specifying activities for supplemental content such that a behavior of the supplemental content is capable of being monitored to ensure that the behavior complies with the rules of the rule set;
        provide the requested primary content to the client device configured for display in addition to at least one supplemental content originating from an external provider other than a publisher of the primary content;
        receive an indication from the client device that at least one behavior of the supplemental content is in violation of the rule set; and
        providing, by the resource provider, instructions for the client device to perform at least one action with respect to the supplemental content, the at least one action comprising at least one of causing execution of a prohibited activity to stop, limiting execution of the supplemental content, or causing an application executing the prohibited activity to be shut down.

7. The system of claim 6, wherein the at least one action also includes at least one of notifying one or more entities or logging information.

8. The system of claim 6, wherein the rule set is able to be applied to multiple instances of supplemental content from one or more publishers.

9. The system of claim 6, wherein the rule set is able to be associated with multiple instances of primary content from one or more publishers.

10. The system of claim 9, wherein a copy of the rule set is capable of being stored on the client device such that the rule set does not need to be reloaded for each instance of primary content to be displayed.

11. The system of claim 6, wherein the rule set is provided as a library capable of being accessed by an active client-side script executing in a browser application.

12. The system of claim 6, wherein the rule set is capable of being associated with any primary content served from a specified domain.

13. The system of claim 6, wherein the rule set includes a complete list of allowable activities, wherein the action is to be performed with respect to the supplemental content in response to any behavior of the supplemental content not included in the rule set.

14. A non-transitory computer-readable storage device including instructions for managing behavior of secondary content, the instructions when executed by a processor causing the processor to:
    receive a request for primary content from a client device; and
    provide the primary content to the client device such that the primary content is caused to be executed with secondary content;
    provide, to the client device, at least one rule set including rules specifying activities for the secondary content executed with the primary content, the secondary content originating from an external provider other than a publisher of the primary content, the at least one rule set to be cached by the client device such that a behavior of the secondary content is capable of being monitored to ensure that the behavior complies with the rules of the at least one rule set;
    receive, from the client device, an indication of at least one behavior of the secondary content, the at least one behavior conflicting with the rules of the rule set; and
    in response to receiving the indication of at least one behavior of the secondary content, instruct the client device to perform an action with respect to the secondary content, the action comprising at least one of causing execution of a prohibited activity to stop, limiting execution of the secondary content, or causing an application executing the prohibited activity to be shut down.

15. The computer-readable storage device of claim 14, wherein the rule set further specifies the one or more actions to be taken upon receiving the indication that at least one behavior of the secondary content conflicts with the rules of the rule set.

16. The computer-readable storage device of claim 14, wherein the access to the at least one rule set is provided via a library capable of being accessed by an active client-side script executing in an application.

17. The computer-readable storage device of claim 14, wherein the access to the at least one rule set is provided by being passed with a call of an active client-side script executing in an application displaying the primary content, the active client-side script configured to apply the rule set to the secondary content wherein the rule set is able to be enforced without modification of the application.

18. The computer-readable storage device of claim 14, wherein the rule set is able to be associated with multiple instances of primary content from one or more publishers, and wherein a copy of the rule set is capable of being stored locally by a client device such that the rule set does not need to be reloaded by the client device for each instance of primary content to be displayed.

19. The computer-readable storage device of claim 18, wherein the at least one rule set is stored on the client device prior to receiving the request for primary content from the client device.

20. The computer-readable storage device of claim 18, wherein access to the at least one rule set is provided in response to determining that the at least one rule set is not currently stored on the client device.

* * * * *